United States Patent [19]

Reinbold et al.

[11] 3,852,028
[45] Dec. 3, 1974

[54] APPARATUS FOR PREHEATING SCRAP

[75] Inventors: Richard J. Reinbold, Allentown; Eugene M. Rudzki, Bethlehem; Bradford K. Pease, Allentown, all of Pa.

[73] Assignee: Bethlehem Steel Corporation, Bethlehem, Pa.

[22] Filed: Oct. 23, 1973

[21] Appl. No.: 408,347

Related U.S. Application Data

[62] Division of Ser. No. 238,870, March 28, 1972, Pat. No. 3,802,830.

[52] U.S. Cl. ............... 432/162, 266/33 S, 432/261
[51] Int. Cl. ............................................. F27b 1/08
[58] Field of Search ............... 432/9, 162, 261, 159; 266/33 S

[56] References Cited
UNITED STATES PATENTS

| | | | |
|---|---|---|---|
| 1,708,509 | 4/1929 | Loshbough | 266/33 S |
| 3,554,508 | 1/1971 | Agnese | 432/57 |
| 3,589,692 | 6/1971 | Lakin | 432/9 |

*Primary Examiner*—John J. Camby
*Attorney, Agent, or Firm*—Joseph J. O'Keefe; Charles A. Wilkinson; John S. Simitz

[57] ABSTRACT

The apparatus comprises a container for a scrap charge which is a clam shell type refractory-lined charging bucket, a movable refractory-lined burner hood equipped with a plurality of downwardly directed burners, said burner hood adapted to fit atop the container, a self-propelled transfer car upon which the container rests and an exhaust system.

Low density or high density scrap charges in the container are transported to a preheater station. The refractory-lined burner hood is placed atop the container and the exhaust duct is connected to the bottom of the transfer car. Hot combustion gases formed in the burner hood flow downwardly through the scrap charges to heat the scrap. Spent hot combustion gases leave the container through the clam shell of the container to the exhaust system and are discharged to the atmosphere. Firing rates are regulated to preheat the low or high density scrap charges in an effective manner.

7 Claims, 3 Drawing Figures ial charges used in steelmaking furnaces. Generally about 30 percent to about 60 percent of the raw material charge in the open-hearth process is scrap, although some shops may charge 100 percent cold scrap. The basic oxygen process uses about 25 percent to 30 percent scrap in the raw material charge. The electric arc process uses substantially 100 percent scrap. Scrap is included in the raw material charge because it is readily available and is generally cheaper than hot metal. Then, too, some plants may not have a sufficient source of hot metal to make up the required raw material charge. The use of scrap also conserves the available iron ores and concentrates for future use.

APPARATUS FOR PREHEATING SCRAP

This is a division of application Ser. No. 238,870, filed Mar. 28, 1972, now U.S. Pat. No. 3,802,830.

BACKGROUND OF THE INVENTION

Steelmaking processes, for example, open-hearth, basic oxygen, electric arc and the like, use cold steel and/or iron scrap as at least a portion of the raw material charges used in steelmaking furnaces. Generally about 30 percent to about 60 percent of the raw material charge in the open-hearth process is scrap, although some shops may charge 100 percent cold scrap. The basic oxygen process uses about 25 percent to 30 percent scrap in the raw material charge. The electric arc process uses substantially 100 percent scrap. Scrap is included in the raw material charge because it is readily available and is generally cheaper than hot metal. Then, too, some plants may not have a sufficient source of hot metal to make up the required raw material charge. The use of scrap also conserves the available iron ores and concentrates for future use.

Steel scrap is broadly classified as light scrap or heavy scrap. Light scrap includes automobile shredded sheet, sheet trimmings, plate trimmings, stamping and pressing trimmings, flashing from forgings, turnings from machining operations, sheet and strip which is unsuitable for use, and the like. Light scrap is frequently contaminated with oil and water introduced during processing. Heavy scrap includes ingot crops and ends, crop ends of blooms and billets, structural steel ends, rail ends, unusable plate, bars, piles and the like and is generally not contaminated with oily matter. Iron can also be used as a portion of the scrap charge. Iron can be in the form of broken molds, obsolete heavy machinery and the like. With varying proportions of light and heavy scrap, as described above, low density scrap charges or high density scrap charges can be charged into the furnace.

Prior practices have been to charge cold scrap into the furnace used to produce steel. As a result, heat time was excessive because the scrap had to be heated in the furnace to melting temperature before refining took place in the steelmaking process. Several attempts to preheat the scrap prior to charging into a steelmaking furnace have been made. The scrap has been heated by hot combustion gases passing upwardly or downwardly through the scrap. Waste hot combustion gases from the steelmaking processes have been used as have hot combustion gases formed by providing burners in a burner hood directly above or below the scrap in a charging bucket. The recent processes are exemplified by U.S. Pat. No. 3,514,279 issued May 26, 1970 to R. F. Jensen et al, entitled "Preheating Scrap with Controlled Oxidation." Although excessive oxidation can be controlled, the problems of uniform heating of the scrap with no channelling of the hot gases, and the vaporization and burning of oils contaminating the scrap and subsequent overheating, resulting in melting and fusion of the scrap have not been solved.

A low density scrap charge consisting primarily of light scrap is susceptible to severe oxidation and melting because of flame impingement on the scrap which is near the burners. Light pieces of scrap have a high surface area to weight ratio resulting in high thermal efficiency in the process of heating scrap. Oil which contaminates light scrap is easily ignited and once ignited burns with a high intensity flame causing the scrap to melt and fuse. The melted scrap passes downwardly through the solid scrap charge and either solidifies on the colder scrap near the bottom of the container, resulting in a large mass of scrap which cannot be removed from the container, or the melted scrap solidifies in the clam shell thereby freezing the clam shell in the closed position. The fusion of the scrap can also close voids in the scrap, thereby causing non-uniform heating of the scrap. The vaporization of the oils causes dense, heavy, noxious fumes which can be emitted from the container.

A high density scrap charge consisting primarily of heavy scrap requires excessive heat input to raise the temperature of the scrap to the desired temperature because the heavy pieces of scrap have a low surface area to weight ratio resulting in poor heat transfer to the scrap and poor thermal efficiency. Then, too, heavy scrap is bulky and the desired volume of scrap which can be charged into a container is often decreased because weight limitations of either the container or the lifting equipment are reached before the container is full. Then, too, large voids can be formed in the scrap charge resulting in severe channelling and non-uniformity of heating of the scrap.

Because the use of burners directly above the scrap charge can cause impingement of the flame on the scrap, resulting in severe oxidation of the scrap, it has been suggested to use hot waste gases from the steelmaking processes to preheat scrap charges. The recycling of waste hot combustion gases from the steelmaking processes may be inefficient because the gases may not contain sufficient heat to significantly contribute to raising the temperature of the scrap.

It is therefore an object of this invention to provide an apparatus and an effective method to preheat scrap which does not result in excessive oxidation of the scrap, minimizes melting and fusion of the scrap, and does not cause ignition of oil contaminated scrap.

It is an object of this invention to provide an improved apparatus for preheating low density and high density scrap charges wherein hot combustion gases are formed in a novel burner hood and flow downwardly uniformly from the burner hood to the mass of charged scrap in a container and pass through the scrap so as to effect a uniform preheating of said scrap at an optimum rate of heat input in a minimum amount of time.

Broadly, the apparatus of the invention includes a container having the interior lined with refractory materials, a refractory-lined burner hood resting atop the container and equipped with a plurality of downwardly directed burners, a self-propelled transfer car upon which the container is supported, said transfer car having a downwardly converging annular passage extending through the floor of the car and an exhaust system beneath the floor of the shop and connected to the annular passage in the transfer car by means of a slidable duct whereby the spent hot combustion gases and vaporized oil are exhausted.

The method of the invention includes charging light and/or heavy scrap into a container supported on a self-propelled transfer car, transporting the container to a preheater station, placing the refractory-lined burner hood atop the container, heating the low or high density scrap charge by hot combustion gases passing downwardly through the scrap charge for a time and at a rate to raise the temperature of the scrap to a mean temperature and exhausting the spent hot combustion gases.

DESCRIPTION OF A PREFERRED EMBODIMENT

Figure 1:
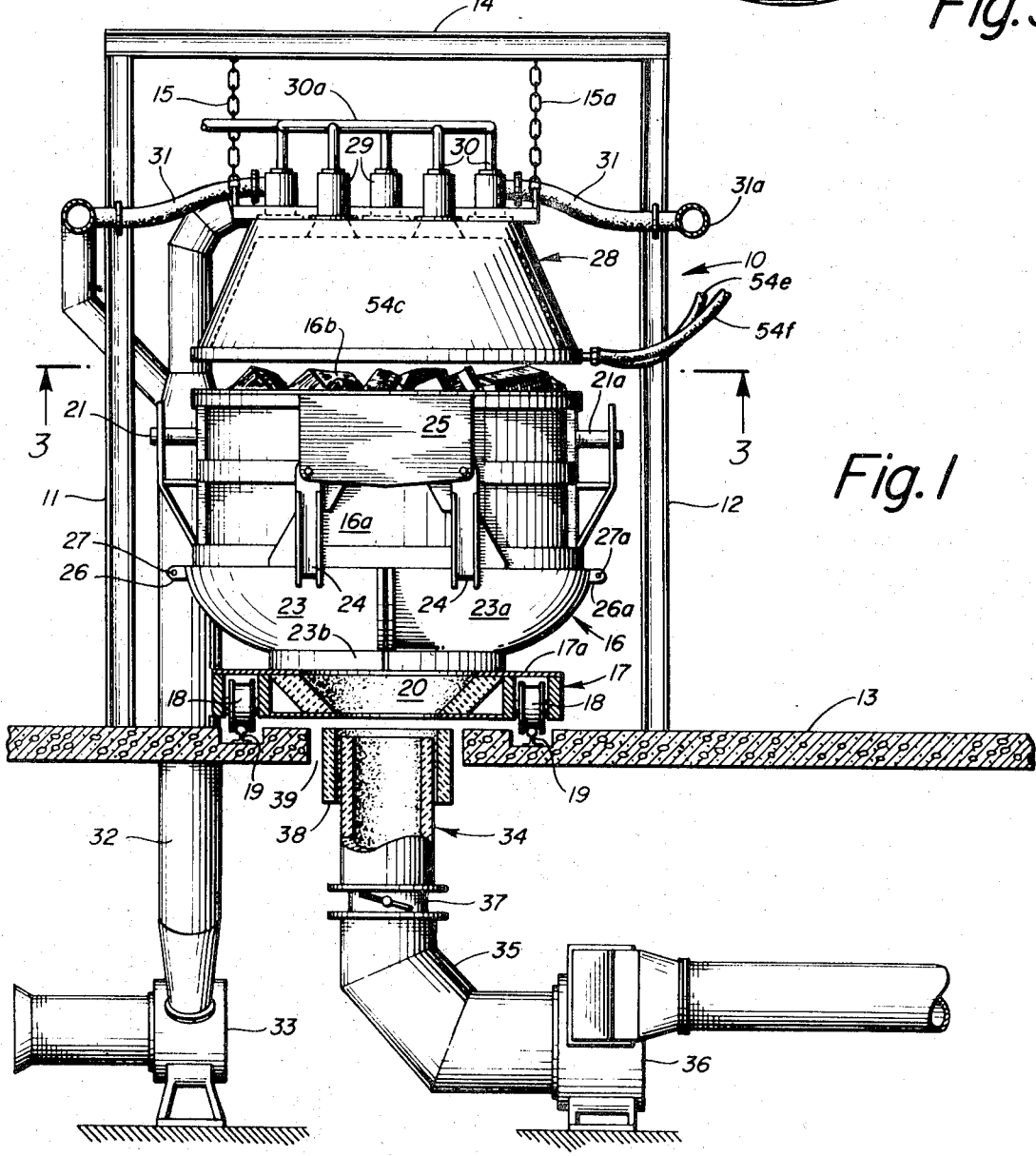
FIG. 1 is an elevational view, partly in section, of the apparatus of this invention.

Referring to the drawings, FIG. 1 shows a preheater station 10 comprising vertical structural steel beams 11 and 12 mounted on the floor 13 of an electrical arc furnace shop and a horizontal structural steel beam 14 supported by the beams 11 and 12. A pair of chains 15 and 15a and hoist mechanism (not shown) are mounted on the horizontal beam 14.

A portable container 16, which is a clam shell type refractory-lined charging bucket, containing a load scrap 16b is shown in position in the preheater section 10. The portable container 16 is supported on a self-propelled movable transfer car 17. The transfer car 17 comprises a floor portion 17a supported on a box-like structural steel framework 17b and two downwardly depending structural steel members 17c. The transfer car is mounted on four double flanged wheels 18, two of which are shown, by means of axles (not shown) attached to the framework 17b and structural members 17c. The flanged wheels 18 of the transfer car 17 are movably supported on tracks 19 which extend from a loading area (not shown) to the preheater station 10. The floor 17a of the transfer car 17 is provided with a downwardly converging annular passage 20 which extends through the entire depth thereof.

The portable container 16 is a vertical, generally cylindrical steel shell 16a having a normally open upper end through which scrap can be charged therein, and a normally closed lower end. The closure on the lower end comprises a clam shell which has two identical swingable partible jaws 23 and 23a. Each of the partible jaws 23 and 23a is supported by two opposed structural members 24 spaced 180° (only one of which is shown for each jaw) pivotally fastened to opposed structural steel brackets 25, also spaced 180° (one of which is shown). The brackets 25 are fastened, as by welding, to the outer surface of the vertical steel shell 16a. Each of the partible jaws 23 and 23a has a bracket 26 and 26a at the periphery thereof which is provided with an opening 27 and 27a whereby appropriate equipment, for example, overhead cranes and attendant crane hooks (not shown) can be attached to open the partible jaws 23 and 23a. Each of the partible jaws 23 and 23a is provided with a semi-cylindrical steel support member 23b fastened, for example, by welding, to the bottom thereof. The semi-cylindrical steel supports 23b define a cylindrical passageway between the partible jaws 23 and 23a and the annular passage 20 in the floor 17a of the transfer car 17. Steel support members 23b also function to support the container 16 on the transfer car 17. It will be noted that the diameter of the cylindrical passage defined by the steel supports 23b may be the same as, but is never less than, the diameter of the upper end of the annular passage 20.

Container 16 is provided with lifting means comprising a pair of opposed trunnions 21 and 21a and attendant structural steel supports 22 and 22a whereby the container 16 can be lifted, for example, by a crane and carried to a steelmaking furnace for discharge of preheated scrap into the furnace.

In FIG. 1 a refractory-lined burner hood 28 supported by chains 15 and 15a is shown in position to be lowered atop the container 16. The burner hood 28 is lowered or raised by the chains 15 and 15a and hoist mechanism (not shown) attached to horizontal beam 14. The burner hood 28 is provided with a plurality of burners 29. Each burner 29 is provided with a fuel line 30 extending from manifold 30a to the burners 29 and an air line 31 extending from bustle 31a. The air manifold 31a is connected to an air intake pipe 32 extending downwardly through the floor 13 of the shop to a fan 33. Cooling-water is supplied to the base 54c of the burner hood 28 through coolingwater inlet hose 54e and its attendant pipe (not shown). The cooling water flows out of the base 54c through pipe 54h and cooling water outlet hose 54f.

An exhaust system 34 comprising ductwork 35, an exhaust fan 36, a damping valve 37 and a slidable duct 38 is provided beneath the floor 13 of the shop. An opening 39 is provided in the floor 13 to allow the slidable duct 38 to be moved upwardly to contact the lower end of passageway 20 and to form a continuous passage therewith.

Figure 2:
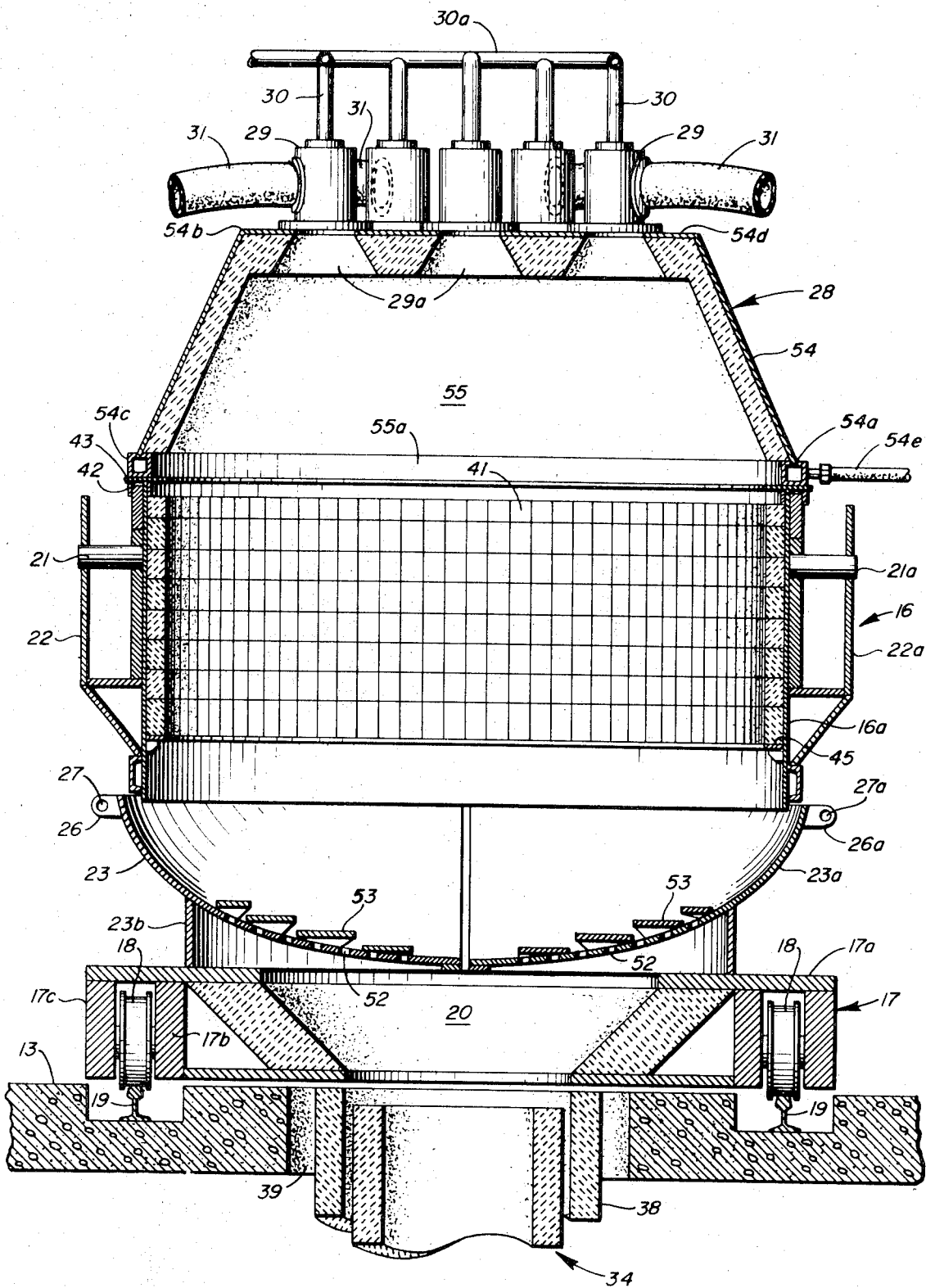
FIG. 2 is a cross-sectional elevational view of the apparatus of this invention.

FIG. 2 is a cross-sectional view in elevation of the container 16 supported on the floor 17a of the transfer car 17 with the refractory-lined firing hood 28 in place atop the container 16. As noted previously, the container 16 is a clam shell type refractory-lined charging bucket comprising a vertical generally cylindrical steel shell 16a having a plurality of courses of refractory material laid-up against the inner surface thereof, to form a refractory lining shown generally at 41. The refractory lining 41 is supported by a refractory support which is a steel ring 45 welded to the steel shell 16a. A second steel ring 42 having a generally inverted U-shape is attached to the top of the steel shell 16a to provide a substantially flat surface 43 whereon the burner hood 28 can be supported.

Referring to FIG. 2, the partible jaws 23 and 23a, which are not lined with refractory material because they are not exposed to high temperatures, for example over 750° F., are provided with a plurality of orifices 52 and baffle plates 53 associated with the orifices 52. The orifices 52 allow the passage 20 in the transfer car 17 to the exhaust system shown generally at 34 in FIG. 1. The slidable duct 38 is shown in contact with the bottom of the floor 17a of the transfer car 17 to thereby provide an essentially closed passage for the spent hot combustion gases to the exhaust system shown in FIG. 1. While we have shown orifices 52 and baffle plates 53 in the partible jaws 23 and 23a to allow passage of spent hot combustion gases out of the container 16, it is not necessary to the method of the invention to use orifices 52 and baffle plates 53 in the partible jaws 23 and 23a since the hot combustion gases can be allowed to pass downwardly to the exhaust system by holding the partible jaws 23 and 23a partly open.

The refractory-lined burner hood 28 is shown in position atop the supporting ring 42 of the container 16. The burner hood 28 comprises a steel shell 54 which has the shape of a frustrum of a cone having a broad bottom base 54a and a narrow upper base 54b. A box-shaped water-cooled steel ring 54c is bolted to the bottom of the steel shell 54. A steel plate 54d is welded atop the steel shell 54 to form the narrow upper base 54b and to provide support for burners 29. The steel shell 54 is lined with a castable refractory lining 55 supported by a steel ring 55a. The bottom surface of the box-shaped water cooled steel ring 54c rests upon and forms a seal with the inverted U-shaped ring 42 atop the container 16 when the burner hood is in position to be fired. A plurality of downwardly directed burners 29 are positioned on the steel plate 54d. A plurality of flared openings 29a are provided in the refractory lining 55 to generally develop the shape of the flame from the burners 29 and direct the hot combustion gases downwardly toward the scrap charge in the container 16.

The combination of the conical shape of the burner hood 28, the flared openings 29a in the castable refractory and the geometrical configuration of the burner heads (shown in FIG. 3) in the burner hood 28 results in a uniform distribution of hot combustion gases in the burner hood 28. The above conditions provide a radiant dome effect which further enhances the uniform distribution of hot combustion gases in the burner hood. The hot combustion gases flow uniformly downwardly from the burner hood 28 into the upper portions of the scrap thereby uniformly heating the scrap. Of course, it must be understood that as the hot combustion gases pass downwardly through the scrap the uniformity of the flow can be altered. While there is nonuniform flow of hot combustion gases through the center and bottom portions of the scrap charge, the scrap is heated to a mean temperature, for example, 1,500° F., and the bottom portions of the scrap are heated to a temperature, for example, about 750° F.

The shape of the burner hood also results in a substantially noiseless firing operation and allows the use of a flame which is relatively short and is contained in the burner hood area. Since the flame does not extend downwardly into the container, the flame does not impinge upon the upper surface areas of the scrap charge thereby minimizing oxidation of the scrap charge. Blowout of gases and flame between the burner hood and container is virtually eliminated because of the combined effect of the uniform downward flow of gases and the downwardly flared shape of the burner hood. The burners can fire gaseous carbonaceous fuel, for example, natural gas, and can use air to control the flame temperature in the hood to, for example, about 2,300° F. The volumetric heat release in the hood can be, for example, about 1,300 BTU/minute/cubic foot. The heat flux at the exit of the burner hood can be, for example, about 4,870 BTU/minute/square foot and a gas can have a velocity of about 8.5 feet per second.

Figure 3:
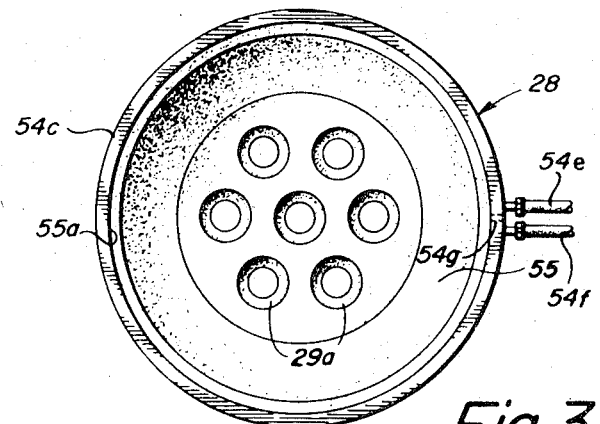
FIG. 3 is a view taken along line 3—3 of FIG. 1.

FIG. 3 shows the arrangement of the downwardly directed burners 29 and the flared openings 29a in the refractory lining 55. The box-shaped water-cooled steel ring shown at 54c is provided with a water inlet pipe 54k and water inlet hose 54e, a water outlet pipe 54h and water outlet hose 54f, and a baffle plate 54g. The baffle plate 54g directs the water introduced through inlet pipe 54e to flow completely around the box-shaped water-cooled steel ring 54c to the outlet pipe 54f. Thus, a continuous flow of cold water is assured in the box-shaped water-cooled steel ring 54c. The inclusion of the box-shaped water-cooled steel ring 54c prevented warpage of refractory support 55a in the refractory-lined burner hood 28 and also prevented warpage of the steel support ring 42 atop the container 16. Unexpectedly, the seal formed between the box-shaped water-cooled steel ring 54c and the steel support ring 42 atop the container 16 was sufficiently tight to substantially prevent leakage of hot combustion gases, flame egress and also aided in making the operation substantially noiseless. While we have shown seven burners as a preferred geometric configuration, it must be understood that more or less burners can be used in other geometric configurations to achieve the results of the invention.

In operation, the container 16 is charged with a low density or high density scrap charge in a scrap yard. The density of the scrap charged into the container 16 is the ratio of the weight of the scrap to that volume of the container occupied by the scrap. We have classified scrap charges as low density scrap charges if the density of the charged scrap is between about 60 pounds per cubic foot to about 120 pounds per cubic foot. Low density scrap charges usually contain primarily light scrap with some heavy scrap added thereto. We have also classified scrap charges as high density scrap charges if the density of the charged scrap is between about 120 pounds per cubic foot to about 200 pounds per cubic foot. High density scrap charges usually contain primarily heavy scrap but can contain light scrap.

The scrap is charged into the container 16 to obtain a uniform distribution across the container 16 and a minimum amount of channels are formed in the scrap charge. Naturally formed voids allow the downward passage of the hot combustion gases through the scrap charge. The container 16 which is carried on the self-propelled transfer car is transported to the preheater station. The refractory-lined burner hood 28 with its plurality of downwardly directed burners 29 is placed atop the supporting ring 42 of the container 16. The slidable exhaust duct 38 is moved into place against the bottom of the transfer car floor 17a to form a continuous passage with the orifices 52 in the partible jaws 23, 23a of the clam shell. The annular passage in the floor 17a of the transfer car 17 and the exhaust system 34 beneath the floor 13 of the shop allows the spent hot combustion gases to be exhausted.

The burners 29 are preferably of the air-natural gas type. The flame temperature is controlled by adjusting the ratio of the air and the gaseous carbonaceous fuel. The design of the burner hood is such that the short flame formed in the burner hood does not extend downwardly beyond the bottom base of the burner hood. The flame does not impinge upon the upper layers of the scrap charge in the container regardless of the fuel rate. This is of particular importance when low density scrap charges are preheated since light scrap in the upper layers of the charge can be easily oxidized and melted. It is of relatively little or no consequence when high density scrap charges are preheated because the upper layers of the scrap charge contain heavy scrap which because of the ratio of surface area to weight are not readily oxidized. We have found that low density scrap charges can be preheated in a firing cycle which includes heating the scrap charge at an initially low rate of heat input, for example, about 10 MM BTU per hour, for a time to raise the temperature of the scrap charge to an intermediate temperature, increasing the rate of heat input to about 30 MM BTU per hour for a time to obtain a mean temperature, for example, 1,500° F., in the scrap charge and controlling the rate of heat input for a time to soak the scrap charge. The above described heating cycle prevents rapid heating of the upper layers of the scrap charge thereby preventing oxidation and melting of the scrap charge. Then, too, oil which contaminates light scrap is vaporized but is not ignited. Therefore, the problems of excessive oxidation and melting of the scrap charge caused by flame impingement on the scrap charge and melting of the scrap charge due to high temperatures caused by burning oil are minimized, if not completely eliminated.

High density scrap charges can be heated in a cycle which includes an initial rapid rate of heat input, for example, about 45 MM BTU per hour for a time to obtain a temperature of about 750° F. in the bottom of the container and regulating the rate of heat input to maintain the temperature of about 750° F. for a time to soak the scrap charge and obtain a mean temperature, for example, about 1,500° F. (The designation MM represents million and has found acceptance among plant personnel as a way of designating heat input.)

It must be recognized that low density scrap charges can be heated at relatively higher firing rates than mentioned above if the upper layer of the scrap charge comprises heavy scrap because the heat input will be absorbed by the heavy scrap, thereby preventing melting, fusion and oxidation of the light scrap. Conversely, a high density scrap charge which has light scrap charged on the top layer is heated at a relatively lower rate of firing than mentioned above to prevent oxidation and possible melting and fusion of the light scrap.

The temperature of the scrap in the upper layers of the scrap charge are as high as 2,300° F. to 2,400° F. at the end of the heating cycle. However, the temperature of the scrap must be below the melting and fusion temperatures thereof. Under the above conditions, the temperature of the scrap at the bottom of the container 16 can reach about 750° F. which is also the temperature of the spent hot combustion gases after they have passed through the scrap charges.

In a specific example of the invention, a high density scrap charge of 130,400 pounds of heavy scrap comprising large plates, small plates, bloom butts, 1 H bundles and molds and stools, having a volume of 720 cubic feet and a density of 180 pounds per cubic foot was fired for about 1 hour and 46 minutes, the initial firing rate being 45 MM BTU per hour until an exit temperature of 750° F. was reached in the bottom of the container. The 750° F. exit temperature was reached after 25 minutes of firing time. Decreasing firing rates as low as 25 MM BTU per hour were used to maintain the temperature at 750° F. for the remainder of the firing cycle. The firing was concluded, the firing hood raised and the scrap charged into an electric furnace. The total fuel was 52 MM BTU. No problems with melting, fusion or excessive oxidation of the scrap were encountered.

In another specific example of the invention, a low density scrap charge of 132,400 pounds comprising molds and stools, pitfines, No. 2 bundles, 1 H bloom butts, 2 H shredded automobile and fragmentized automobile scrap was charged into a container. The volume of scrap was 1,960 cubic feet and the charge density was 68 pounds per cubic foot. The container was placed on a transfer car and positioned in a preheater station. The firing hood was placed in position atop the container and the slidable duct placed in operation position. The scrap charge was fired at a rate of about 10 MM BTU per hour for an initial 14 minutes and between 25 MM BTU/hour to 30 MM BTU/hour for an additional 41 minutes for a total firing time of 55 minutes. The temperature of the spent hot combustion gases flowing out of the container through the clam shell was 750° F. Firing was stopped and the preheated scrap charged into an electric furnace. Preheating scrap charges prior to charging the scrap into an electric furnace effectively decreases the time required to melt and refine the scrap charge and the power used to melt and refine the scrap charge when compared to the use of cold scrap charges. The time required to melt and refine three scrap charges preheated substantially the same as the second specific example was 11.7 percent less and the power 11.9 percent less than the time and power required to melt and refine cold scrap charges in the same electric furnace.

We claim:

1. Apparatus for preheating scrap in a preheater station prior to charging said scrap into a furnace, comprising:
   a. containing means adapted to hold said scrap,
   b. heating means adapted to fit atop said containing means to provide hot combustion gases to heat said scrap, said heating means being a burner hood comprising a steel shell in the shape of a frustrum of a cone, having a broad bottom base and a narrow upper base, a box-like water-cooled steel ring having a water inlet pipe and a water outlet pipe and a baffle plate therebetween to direct the flow of water around said box-like steel ring attached to the broad bottom base and a steel plate attached to the narrow upper base, a refractory lining on the inside surface of the steel shell and a plurality of downwardly directed burners mounted on said narrow upper base,
   c. supporting means to hold said containing means and adapted to allow hot combustion gases to pass therethrough, and
   d. exhausting means adapted to be mated with said support means to exhaust said hot combustion gases from said containing means.

2. The apparatus as claimed in claim 1 wherein the containing means comprises a generally cylindrical steel shell central portion, a normally open upper end portion and a normally closed lower end portion, a refractory lining laid up against a portion of the steel shell, the lower end portion being closed by a pair of partible jaws pivotally mounted on said lower end portion, said partible jaws being supplied with a plurality of orifices whereby hot gases can be exhausted from said containing means and baffle plates adjacent said orifice.

3. An apparatus for preheating scrap in a preheater station according to claim 1 wherein the burner hood is lined with a castable refractory and the orifices and associated burners are positioned in the upper plate means in a predetermined configuration.

4. An apparatus for preheating scrap in a preheater station according to claim 1 additionally comprising:
   e. a hollow water-cooled ring means having a water inlet pipe and a water outlet pipe and a baffle therebetween to direct a flow of water around said ring, said ring being adapted to be interposed between the burner hood means and the scrap container means.

5. An apparatus for preheating scrap in a preheater station according to claim 1 wherein the exhaust means is adapted to be mated over the lower portions of the container means.

6. An apparatus for preheating scrap in a preheater station according to claim 1 wherein the burners and burner orifices in the upper plate means are arranged in a predetermined configuration in which there is at least one central burner and a plurality of burners regularly spaced circumferentially about said central burner.

7. In apparatus for preheating scrap in a preheater station prior to charging said scrap into a furnace, said scrap being contained in a refractory-lined clam-shell type charging container, supporting means including a movable transfer car mounted on a track extending from a scrap loading station to said preheater station and fastened to the floor of a shop whereby said refractory-lined clam-shell type charging container can be moved from said loading station to said preheater station, heating means placed atop said refractory-lined clam-shell type charging container in said preheater station whereby hot combustion gases for heating said scrap are formed and are directed uniformly downwardly through said scrap and exhaust means connected to the bottom of said transfer car and extending downwardly through said floor of said shop to a stack means, said heating means comprising:

a burner hood having a steel shell in the shape of a frustrum of a cone having a broad bottom base and a narrow upper base, a castable refractory lining the inside surface of the steel shell, a plurality of downwardly directed burners mounted in a predetermined geometric configuration on said narrow upper base, a plurality of flared openings in said castable refractory lining adjacent each of said plurality of burners in a predetermined geometric configuration to combine with the predetermined geometric configuration of the burners whereby the shape of the flame projecting from said burners is controlled and said hot combustion gases formed in the hood are directed uniformly downwardly through said scrap in said refractory-lined clam-shell type charging container.

* * * * *